April 18, 1967     M. J. HECKMAN     3,314,168

MATHEMATICAL INSTRUCTION MEANS

Filed April 24, 1964

INVENTOR.
Martha Jane Heckman
BY
Barnard, McGlynn & Reising
ATTORNEYS

United States Patent Office 3,314,168
Patented Apr. 18, 1967

3,314,168
MATHEMATICAL INSTRUCTION MEANS
Martha Jane Heckman, 1985 Villa,
Birmingham, Mich. 48008
Filed Apr. 24, 1964, Ser. No. 362,427
6 Claims. (Cl. 35—31)

This invention relates to mathematical instruction means and more particularly to a series of physical objects with indicia thereon which may be easily utilized to instruct young people in arithmetic and mathematics.

In educating young people, particularly in arithmetic and mathematics, the most popular manner is to utilize textbooks, workbooks and the like along with oral instruction to teach the fundamentals of the subject. It is well known that certain students will more rapidly assimilate the necessary knowledge and will more thoroughly learn a subject if the learning process incorporates physical objects that they may touch and play with to illustrate the fundamental precepts of the area of study.

It is here proposed to provide a series of cubes and related cards, or the like, with appropriate numbers thereon, the cubes being in three different sets. The first two sets of cubes have numbers on the faces thereof, the numbers on one set being in one range of numbers and the numbers on the second set being in a second range of numbers. The third set of cubes is provided with arithmetical signs on the faces, and these cubes may be combined with the numbered cubes to show an arithmetical equivalent of a particular number on one of the cards. Thus, the child who is learning the rudiments of arithmetic may turn over one of the cards to show a particular number, and then arrange the cubes such that an arithmetical equivalent of the number on the card is shown on the exposed or upper faces of the cubes.

Instruction in this manner is relatively simple, and the fundamentals are effectively assimilated by the student since he is able to touch and arrange the physical objects that are utilized. At the same time, the instruction is made more enjoyable for the student since the arrangement of the cubes may take the form of a game in which the student may compete with other students in some suitable manner.

These and other advantages will become more apparent from the following description and drawing in which.

Figure 1:
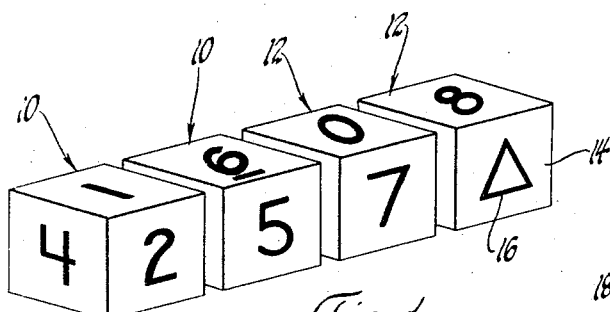
FIGURE 1 is a perspective view of the first two sets of cubes showing the numbers thereon in the different ranges.

Referring more particularly to the drawing, FIGURE 1 best illustrates the first two sets of numbered cubes. These include pairs of more of identical cubes 10 and 12, the cubes 10 being provided with numbers on the various faces in the first range of numbers and the cubes 12 being provided with numbers on the faces thereof in a second range of numbers. Cubes 10 and 12 may be of any suitable size and may be made of any suitable material. Such cubes may be of the size of dice or building blocks, and it is desirable that they be of the same color with the numbers on the faces formed in any suitable manner, as by embossing, printing, or by cutting into the faces of the cubes.

Figure 3:
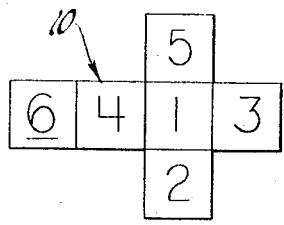
FIGURE 3 is an expanded view of one of the cubes in the first set of cubes, illustrating the various numbers on the various faces.

The cubes 10 are provided with numbers that range from 1 through 6 inclusive, as illustrated in FIGURE 3. No particular order of numbers on the faces is necessary so long as each face contains one of the numbers in the given range.

Figure 4:
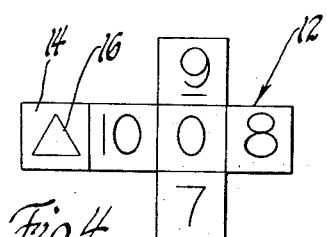
FIGURE 4 is an expanded view of one of the cubes in the second set of cubes, showing the indicia on the various faces.

Similarly, cubes 12 are provided with numbers on the faces that range from 7 through 10 and 0 on five of the six faces, as illustrated in FIGURE 4. Again, it makes no difference what order the numbers appear on the various faces, provided only one number appears on each face. The sixth face 14 of each of the cubes 12 is provided with a geometrical figure or the like, such as the triangle 16 illustrated in the figures of the drawing, which may be used to indicate a "wild" number and stand for any other desired number that the student wishes it to represent. This permits a greater degree of flexibility in the manner with which the cubes are used.

Figure 2:
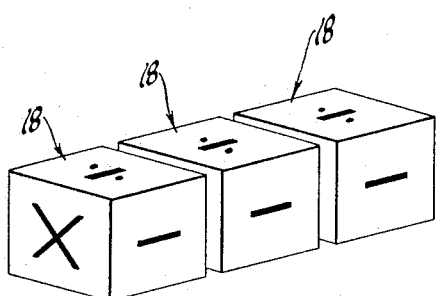
FIGURE 2 is a perspective view of the third set of cubes with the arithmetical signs on each of the faces.
Figure 5:
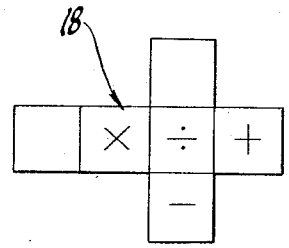
FIGURE 5 is an expanded view of one of the cubes in the third set of cubes showing the arithmetical signs on the faces thereof.

The third set of cubes 18 are identical, as shown in FIGURE 2, and have arithmetical signs on four of the six faces thereof, best illustrated in FIGURE 5. These are the four fundamental or rudimentary arithmetical signs with which the students are familiar. Cubes 18 are of the same size as the cubes 10 and 12 although they may be formed of a different color or have some other means distinguishing these cubes from the cubes 10 and 12. This permits the student to more rapidly differentiate between the numbered cubes and the cubes with the arithmetical signs.

Figure 6:
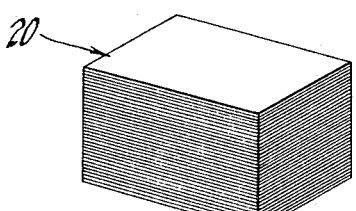
FIGURE 6 is a perspective view of a stack of cards, each card having a number on one of the faces thereof.

As illustrated in FIGURE 6, a plurality of cards may be provided, each card having a number on one face and being blank on the other. The cards may be arranged in a stack with the numbered faces hidden so that the student may turn over a card to expose a particular number. Such cards may be arranged at random so that the student will have no indication as to the number on the underside of the card he is about to expose.

Figure 7:
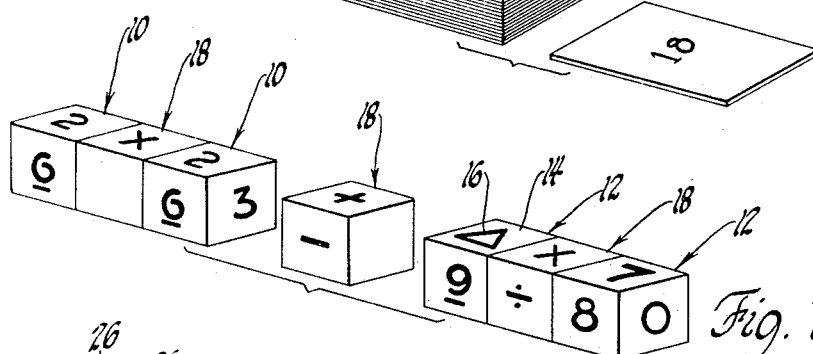
FIGURE 7 is a perspective view of the three sets of cubes arranged so that their upper faces indicate the arithmetical equivalent of a given number.

The cubes and cards may be used in the following manner. As above indicated, one of the cards 20 is turned over to expose a number, such as the number 18 as illustrated in FIGURE 6. The student then arranges the two sets of numbered cubes 10 and 12 with the cubes 18 having arithmetical signs to show an equivalent form of the number exposed on the card. For example, FIGURE 7 illustrates an equivalent form of the number 18 of FIGURE 6, if it is assumed that the triangle 16 on the face 14 of the cube 12 stands for the number 2. Thus, the equivalent form shown in FIGURE 7 is $(2 \times 2) + (2 \times 7)$ which equals 18. It will become readily apparent that there are many other combinations of the seven cubes which will equate to the number 18.

Figure 8:
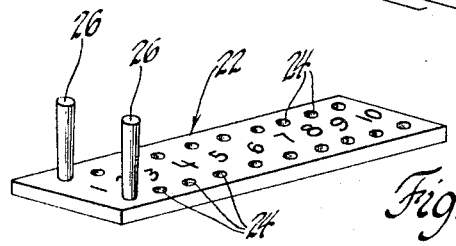
FIGURE 8 is a perspective view of a scoreboard which may be utilized with the instructional objects of FIGURES 1 through 7.

It may be desirable to make a game out of the arrangement of the cubes and have several students compete against each other. In such case, any suitable scoring means may be provided, such as the scoreboard 22 with a series of apertures 24 therein to receive the pegs 26. The apertures 24 may be numbered, as indicated in FIGURE 8, and the movement of the pegs along the apertures 24 will indicate the competitive score between two such players. Any other suitable scoring means may be provided for this purpose.

Thus, a mathematical instruction means is provided which is very simple to operate and yet which is extremely effective in teaching the fundamentals of arithmetic and mathematics to a student. The materials are relatively inexpensive to manufacture and produce and by providing such materials, the student more enjoyably and more rapidly assimilates the necessary knowledge.

It will be apparent that numerous modifications and changes will occur to those having ordinary skill in the art after having had reference to the foregoing description and drawings. However, it is not intended to limit the invention by the foregoing but by the scope of the appended claims in which:

I claim:

1. Mathematical instruction means comprising:
   a first set of at least two identical cubes having numbers on the faces thereof, said numbers being in a first range of numbers;
   a second set of at least two identical cubes having numbers on the faces thereof, said numbers being in a second range of numbers;
   a third set of at least three identical cubes having arithmetical signs on the faces thereof;
   and a plurality of cards, each of said cards having a number on one face thereof said cards being adapted to be placed in a stack with the numbers thereon hidden from view and from which one of said cards may be selected at random to expose a number;
   at least some of said first, second, and third sets of cubes being arrangeable to show an arithmetically equivalent form of said exposed number on said one card.

2. The instruction means set forth in claim 1 wherein distinguishing means are provided to distinguish said third set of cubes from said first and second sets of cubes.

3. The instruction means set forth in claim 2 wherein said third set of cubes is of a different color than said first and second sets of cubes.

4. The instruction means set forth in claim 1 wherein each face of each of said first set of cubes is provided with a number from the range of numbers from 1 to 6 inclusive, each of said faces of each cube having a different number thereon.

5. The instruction means set forth in claim 1 wherein each of four faces of each of said second set of cubes is provided with a number from the range of numbers from 7 to 10 inclusive, each of said four faces having a different number thereon, and another face of each of said second set of cubes is provided with a 0.

6. The instruction means set forth in claim 5 wherein the sixth face of each of said cubes in said second set is provided with indicia to denote any number.

References Cited by the Examiner
UNITED STATES PATENTS

| | | | |
|---|---|---|---|
| 431,102 | 7/1890 | Anderson | 35—70 |
| 1,246,152 | 11/1917 | Perrine | 35—69.1 |
| 1,302,805 | 5/1919 | Jentz | 35—31.4 |
| 1,977,842 | 10/1934 | Badanes | 35—73 X |
| 2,861,809 | 11/1958 | Fischl | 273—146 |

EUGENE R. CAPOZIO, *Primary Examiner.*

W. GRIEB, *Assistant Examiner.*